US010986832B2

(12) United States Patent
Moore et al.

(10) Patent No.: US 10,986,832 B2
(45) Date of Patent: Apr. 27, 2021

(54) ANIMAL-PROOF HOODED BARRIER, RELATED ENCLOSURE SYSTEMS AND METHOD OF MAINTAINING AN ANIMAL-PROOF DOMAIN

(71) Applicant: Vanquish Fencing, Inc., Morrisville, PA (US)

(72) Inventors: Donald E. Moore, Morrisville, PA (US); James McCamie Wilson, Sr., Midland, NC (US)

(73) Assignee: Vanquish Fencing Inc., Morrisville, PA (US)

( * ) Notice: Subject to any disclaimer, the term of this patent is extended or adjusted under 35 U.S.C. 154(b) by 0 days.

(21) Appl. No.: 16/286,828

(22) Filed: Feb. 27, 2019

(65) Prior Publication Data

US 2020/0015473 A1 Jan. 16, 2020

Related U.S. Application Data

(60) Provisional application No. 62/635,715, filed on Feb. 27, 2018.

(51) Int. Cl.
*A01M 29/30* (2011.01)
*E04H 17/00* (2006.01)
*A01K 3/00* (2006.01)
*A01M 23/00* (2006.01)

(52) U.S. Cl.
CPC .......... *A01M 29/30* (2013.01); *E04H 17/003* (2013.01); *A01K 3/00* (2013.01); *A01M 23/00* (2013.01)

(58) Field of Classification Search
CPC ..... A01M 29/30; A01M 23/00; E04H 17/003; A01K 3/00
See application file for complete search history.

(56) References Cited

U.S. PATENT DOCUMENTS

| 2,112,229 | A | | 1/1879 | Dowlin | |
|---|---|---|---|---|---|
| 5,143,354 | A | | 9/1992 | Nolan | |
| 5,267,724 | A | * | 12/1993 | Heath | A01K 1/035 256/11 |
| D424,702 | S | * | 5/2000 | Binns | D25/45 |
| 6,113,076 | A | | 9/2000 | Hancock-Bogese | |

(Continued)

FOREIGN PATENT DOCUMENTS

| AU | 2006235859 A1 * | 5/2008 | |
|---|---|---|---|
| GB | 2528859 A * | 2/2016 | B63G 13/00 |

*Primary Examiner* — Basil S Katcheves
*Assistant Examiner* — Omar F Hijaz
(74) *Attorney, Agent, or Firm* — Calderone Bullock LLC

(57) ABSTRACT

The present invention provides a substantially animal-proof barrier that includes (a) two or more supports laterally spaced apart to define a substantially vertical plane between each support, (b) fencing material that is attached to each of the supports and spans the plane between each support to form a simple barrier, wherein the simple barrier divides a domain into a first area and second area, (c) a hood having a first section originating from a top edge of the simple barrier that forms an angle of about 10 degrees to about 80 degrees with the simple barrier, and a second section extending from a lower end of the first section in a direction towards the simple barrier, and optionally (d) a hood corner assembly to provide a hood at a corner formed by the simple barrier, that includes an upper corner section, a lower corner section, and a pair of brackets.

11 Claims, 16 Drawing Sheets

(56) References Cited

U.S. PATENT DOCUMENTS

| | | | |
|---|---|---|---|
| 6,199,831 B1* | 3/2001 | Patrick | A01K 3/00 |
| | | | 256/11 |
| D448,318 S | 9/2001 | Chia | |
| 6,571,517 B2 | 6/2003 | Wulff | |
| 7,040,605 B2 | 5/2006 | Lappen | |
| 7,562,453 B1 | 7/2009 | Benner | |
| 2006/0207195 A1 | 9/2006 | Donoho | |
| 2008/0110106 A1 | 5/2008 | Holly | |
| 2010/0243979 A1* | 9/2010 | Moore | E04H 17/02 |
| | | | 256/19 |
| 2013/0067796 A1* | 3/2013 | Dong | A01M 1/14 |
| | | | 43/109 |
| 2014/0223805 A1* | 8/2014 | Chilton | A01M 29/30 |
| | | | 43/131 |
| 2018/0119445 A1* | 5/2018 | McCarroll | E04H 17/1434 |
| 2018/0274247 A1* | 9/2018 | Potthast | E04F 19/02 |
| 2019/0208764 A1* | 7/2019 | Romano | A01M 31/002 |
| 2019/0330877 A1* | 10/2019 | Brett | E04H 17/02 |

\* cited by examiner

ANIMAL-PROOF HOODED BARRIER, RELATED ENCLOSURE SYSTEMS AND METHOD OF MAINTAINING AN ANIMAL-PROOF DOMAIN

BACKGROUND OF THE INVENTION

For centuries, humans have erected fences and other barriers to keep small animals in or outside of yards, dwellings, food storage areas and the like. However, most small animals, such as rats, mice, snakes and other reptiles can crawl and climb and are therefore able to easily circumvent simple fences. In recent years, the ability to exclude small animals from certain areas has taken on great significance from economic, ecological and safety perspectives. For example, certain sensitive municipal or utility sites, such as power substations or water reservoirs are adversely affected when small animals circumvent the fencing placed around such areas and short circuit electrical equipment or otherwise contaminate the equipment, precipitating a site-wide shut down, which may result in blackouts, and/or power or water shortages for the surrounding communities and industries. Less catastrophically but no less significantly, barriers for keeping wildlife and other small animals in or out of an area are useful in residential areas, picnic areas, wildlife sanctuaries, pool areas, zoological and botanical gardens, and agricultural lands.

In addition to providing an effective barrier against small animals, any fencing or barrier must have a structure that is capable of enduring a full range of weather effects with little or minimum maintenance, including high winds, hurricane winds, ice, large volumes of snow, and exposure to UV rays.

One such barrier is described in U.S. Pat. No. 8,840,090 assigned to the Applicant and incorporated herein by reference in relevant part. The '090 patent provides an animal-proof barrier having a simple barrier and a hood that forms an angle with a front surface of the simple barrier of about 10 to about 80 degrees and forming a channel having a substantially V-shaped cross section. While this design may help to prevent animals from climbing over the barrier, this design requires the use of brackets to support the hood. The use of brackets may extend the time required to install the fence and may also provide a route for animals to access and scale the hood.

In view of these challenges, there remains a need in the art for a fence or barrier system that is easy to assemble even in remote locations, but is effective in excluding small animals from the enclosed area and is capable of withstanding extreme weather conditions with little or no maintenance.

BRIEF SUMMARY OF THE INVENTION

The invention encompasses a substantially animal-proof barrier ("APB") that includes (a) two or more supports that are laterally spaced apart to define a substantially vertical plane between each support; (b) fencing material that is attached to each of the supports and spans the defined substantially vertical plane between each support to form a simple barrier that has a top edge, a bottom edge, a front surface and a back surface, wherein the simple barrier divides a domain into a first area and a second area; and (c) a hood having a first section originating from the top edge of the simple barrier that forms an angle of about 10 degrees to about 80 degrees with the simple barrier, and a second section extending from a lower end of the first section in a direction towards the simple barrier.

Optionally included is a hood corner assembly configured to provide a hood suited to be positioned at a corner formed by the simple barrier, wherein the hood corner assembly connects a first hood and a second hood that are located adjacent to the corner formed by the simple barrier so as to provide a continuous hood structure. The hood corner assembly may comprise an upper corner section, a lower corner section, and a pair of brackets. The upper corner section comprises a panel bent along a vertical axis to form a right side and a left side, wherein the right side can be positioned flush against a first section of a first hood on a first side of a corner, and the left side can be positioned flush against a first section of a second hood on a second side of the corner. Each bracket comprises a first panel having a triangular configuration, wherein a first flange extends perpendicularly from an upper end of the first panel, and a second flange extending perpendicularly from a lower end of the first panel in an opposing direction as the first flange, wherein the second flange is configured to be positioned flush against a surface of a second section of a hood. The hood corner assembly further comprises a lower corner section comprising a panel that can be positioned flush against the first flanges of each bracket so as to enclose an underside of the hood corner assembly to prevent access to the interior area of the hood or hood corner assembly by animals or the like.

Also included within the scope of the invention are enclosure systems that incorporate at least one APB to maintain an animal population on a first side of a domain. Such enclosures include (a) at least three supports that are laterally spaced apart to define substantially vertical planes between each support; (b) fencing material that is serially attached to each of the at least three supports to span the defined substantially vertical plane between each support to form a simple barrier that has a top edge, a bottom edge, a front surface and a back surface, wherein the simple barrier divides a domain into a first area and a second area; and (c) a hood having a first section originating from the top edge of the simple barrier that forms an angle of about 10 degrees to about 80 degrees with the simple barrier, and a second section extending from a lower end of the first section in a direction towards the simple barrier. Such enclosure systems may further optionally include a hood corner assembly for use in securing a corner formed by a simple barrier to prevent animals from climbing over the simple barrier at the corner thereof.

Methods of maintaining an animal population in an enclosure comprising placing along a perimeter of the domain the APB or the enclosure of the invention are also described.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
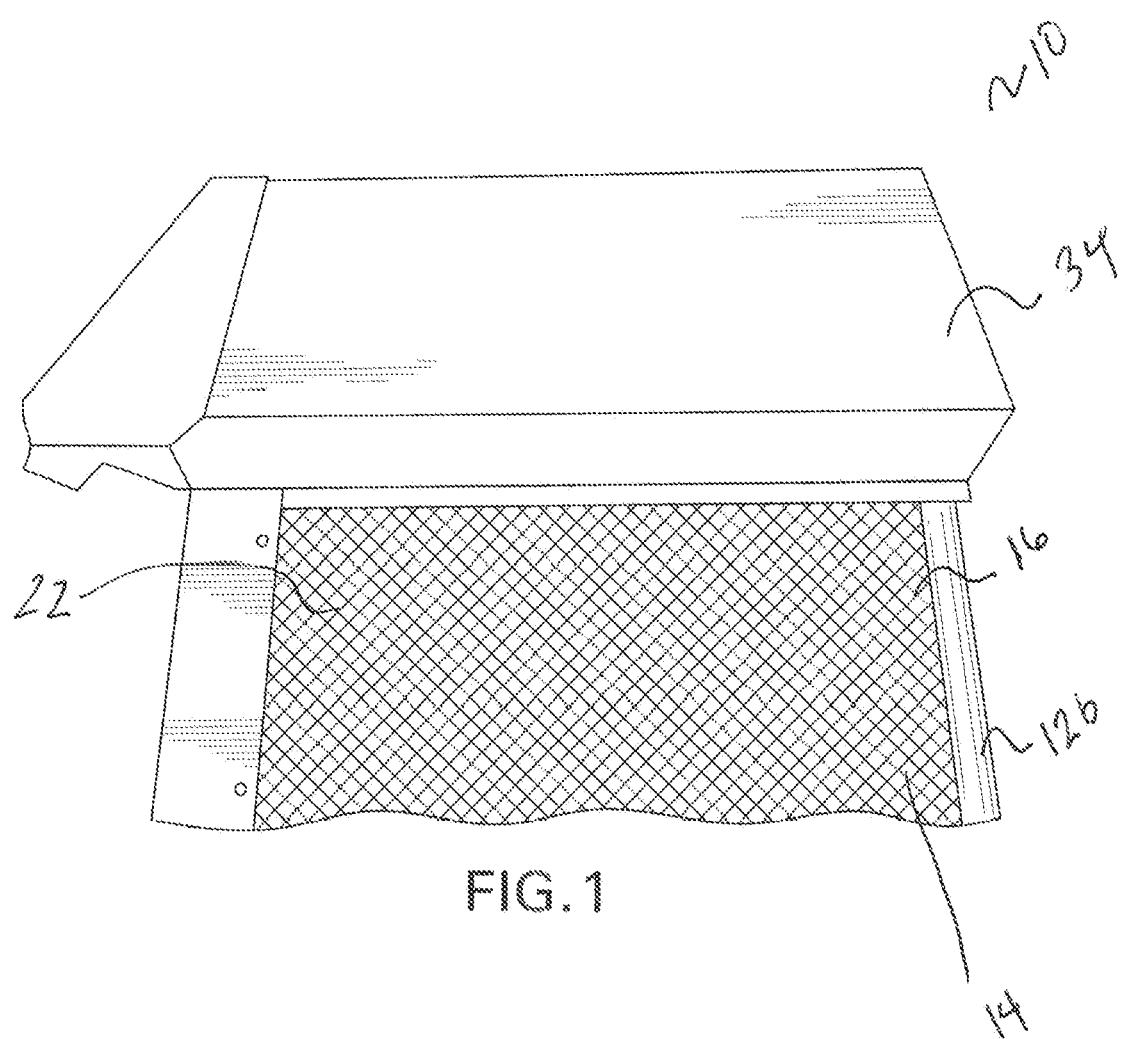
FIG. 1 is a perspective view of an embodiment of an animal proof barrier constructed in accordance with the present invention.

The invention described herein provides a substantially animal-proof hooded barrier ("APB") that allows for the enclosure of a space of any size to exclude from or maintain within the enclosure animals, particularly small animals that are able to climb up and over conventional fencing. Also included within the invention are enclosure systems that incorporate at least one APB, and preferably are wholly comprised of APBs. Such enclosure systems may include at least one access portal (such as a door, gate or gated bridge), allowing pedestrian traffic and/or vehicle traffic to pass in and out of the enclosure. Also included within the scope of the invention are methods of maintaining an animal population within an enclosure using an enclosure system that includes the APBs of the invention.

Numerous applications exist for the APBs, enclosure systems and methods of the invention. For example, the invention may be used to surround power substations, recreational parks, water reservoirs, playgrounds, terraces and patios and other areas where it is desirable to maintain a substantially small-animal-free zone. Other applications include use in wildlife parks and sanctuaries, zoological and botanical gardens, golf courses, outdoor sports venues, hotels and other leisure facility grounds, swimming pool areas, and the like.

The invention includes an APB. "Animal proof" as used herein means that the barrier substantially prevents animals from climbing up and over it, especially small animals (for example, animals that are less than or equal to about 100 pounds in weight). For example, such animals may include, without limitation, any and all non-flying climbing mammalian and non-mammalian animals, such as, for example, rodents, squirrels, chipmunks, beavers, gophers, groundhogs, and prairie dogs, small primates, such as rhesus monkeys, lemurs, tarsiers, and marmosets, and small humans, climbing cats such as bobcats, wildcats, domestic and feral cats, nonflying birds such as chickens and turkeys, and reptiles or amphibians such as snakes, lizards, alligators, frogs, toads, anoles, crocodiles, and newts.

In an embodiment, the APB includes two supports, although three or more supports may be preferred, depending on the grade and other topography of the terrain or floor surface, if an indoor installation. For convenience, "substrate" shall be used herein to collectively refer to the terrain, floor, concrete apron or other surface (indoor or outdoor) into or onto which the support(s) are inserted.

The supports may be spaced laterally from one another such that a vertical plane is defined between any two serially situated supports. Such spacing may be in a linear format or the spacing may be offset (e.g., along a hypothetical zig-zag or curve); spacing will necessarily vary depending upon several factors, including the size and shape of the domain that the APB or enclosure is intended to circumscribe, the means by which the supports are secured or installed into/onto the substrate, and/or the topography of the substrate (e.g., inclined versus flat). In an embodiment, the support(s) are spaced about 2 feet to about 20 feet from one another, about 5 feet to about 10 feet from one another, and/or about 7 feet to about 9 feet from one another. In a given enclosure, the support(s) may be spaced the same distance from one another or the distance may vary.

The support(s) may be of any dimension and such dimensions may vary from support to support as necessary or desirable in a specific installation. In an embodiment, it may be desirable that the height dimension (x-dimension) of the support is about 4 feet to about 20 feet, about 5 feet to about 15 feet, or about 6 feet to about 8 feet.

The y- and z-dimensions (width and depth dimensions, respectively) may be any desirable or necessary for the particular installation in which the APB(s) or enclosures are used. For example, in an embodiment at least one of the supports may be an architectural structure (e.g., a pool cabana, shed, dwelling, or other building). In an embodiment, the support(s) may be conventional fence posts having, for example, either round, elliptical, or polygonal cross sections. In an embodiment that may be preferred, the support(s) have a round cross-section of a diameter of about 2 inches to about 6 inches.

The supports may be made of any suitable material, including but not limited to wood, plastic, polymer, fiberglass, metal, aluminum, steel, stainless steel and combinations thereof. The supports may be hollow or solid; in an embodiment they are coated with a friction-reducing polymer or other substance to further deter or prevent animals from climbing.

The supports may be placed on, in or otherwise attached to the selected substrate by any means. For example, if the substrate is earth, conventional post-holes or ditches may be dug and the post inserted below the ground or the supports may be placed via pile-driving or vibro-driving. Alternatively, the supports may be inserted in brackets or tracks that run through or are attached to a concrete or blacktop floor or apron. In another embodiment, the supports may be secured to the substrate using bolts (or other fasteners), high strength epoxies, resins, or other adherent, or using external stakes and cables. In an embodiment, the supports are suspended from above (from a track, ceiling or overhanging bar) in stalactite-like configuration. In an embodiment, it may be preferable that the supports are placed below ground or are spaced within a cement or blacktop apron, to make it more difficult for animals to circumvent the barrier or enclosure by digging under it.

As detailed above, the two (or more) supports are spaced apart to define the substantially vertical plane between each pair of serially arranged supports. A fencing material is attached to each of the individual supports and spans the defined vertical plane(s). The fencing material may have the same height as the supports or may have a height less than that of the supports such that the fencing material does not reach a top of each support. The two supports and the fencing material so situated form a simple barrier structure. The simple barrier has a bottom edge (that abuts the substrate or is buried within the substrate), a front surface, and a back surface.

The invention in some embodiments will be described using words such as "upper" and "lower," "inner" and "outer," "right" and "left," "front" and "back," and the like. These words and words of similar directional import are used for assisting in the understanding of the invention when referring to the drawings or another component of the invention and absent a specific definition or meaning otherwise given by the specification for such terms, should not be considered limiting to the scope of the invention.

The fencing material may be any known or to be developed in the art. Suitable fencing material may include materials in any format, such as mesh, chain link, metal sheets, polymer films, polymer sheets, screen, plates and panels. The fencing material (regardless of format) may comprise any material; suitable materials from which the fencing material may be made, in whole or in part, may include glass, wood, metal, polymer, textiles and fiberglass. Aluminum, acrylic polymer and vinyl polymers may be preferred. These fencing materials may be treated with a coating or other substances that increase the materials' ability to withstand weather and act to reduce friction to discourage climbing, such as UV-absorbent coatings and/or polytetrafluoroethylene (PTFE) over-coatings. In an embodiment, the fencing material may be about ⅛ to about ⅜ inch mesh.

The fencing material is attached to the supports by any means known in the art. Suitable means includes use of screws, nails, epoxies, strapping, staples, brads, ties, and other fasteners. In an embodiment, the fencing material contains integral pocket-like structures along a length of fencing material that are adapted to accept insertion of the supports. In an embodiment, the fencing material is attached to the supports using stainless steel straps, such as those available from Panduit Corporation, of Tinley Park, Ill.

The fencing material may reach the top of each of the support, or may stop short of the top of each support, and the fencing material may extend to or below the soil line (e.g., it can be buried in or enclosed within, the substrate). In an embodiment, it may be preferred that the fencing material is buried in the substrate about 3 to about 12 inches or about 5 inches to about 7 inches below the soil line.

In an embodiment, a top rail is positioned so as to extend between the top ends of the supports or may be positioned above/on top of the top end of the supports. The top rail may serve a reinforcing/stabilizing function, a decorative function, and/or it may be used as a point of attachment of a hood or a hood corner assembly, as described herein. The top rail may be made of any material that is suitable (such as those articulated above, for use in the fabrication of the supports), although metal and/or fiberglass materials may be preferred. The top rail may be round or polygonal in cross-section and may be solid or hollow. In embodiments where the fencing material does not reach the top end of the supports, an intermediate rail may extend between adjacent supports along the upper end of the fencing material to help secure and support the fencing material.

The APB also includes a hood. The hood includes a first section connected to a second section. Preferably, the first section and the second section are connected so as to form an angle of about 90 degrees, such that the hood has a substantially L-shaped configuration. The first section and second section may be unitary in construction or may be formed from separate pieces. The first section is substantially rectangular and planar in configuration and includes an upper end and a lower end. The second section is also substantially rectangular in configuration and is preferably planar but may have a convex or concave configuration in some embodiments, and includes an upper end and a lower end. The upper end of the second section is connected to and along the lower end of the first section.

In use, the hood can be connected to the simple barrier, such that the first section of the hood originates from the top ends of the supports (or from the top rail of the simple barrier) and extends in a downward direction from the top rail of the simple barrier and outwardly therefrom, so as to form an angle of about 10 degrees to about 80 degrees with the simple barrier. Alternately, the angle formed by the first section of the hood and the simple barrier may be about 20 to about 50 degrees, or about 30 to about 45 degrees.

The second section extends from the lower end of the first section in a downward and inward direction towards the simple barrier. Since the second section extends from the lower end of the first section at an angle of about 90 degrees relative to the first section, the second section is positioned at a slight downward angle relative to a horizontal plane. The lower end of the second section preferably contacts the front surface of the simple barrier or an upper end of the fencing material when the hood is installed on the simple barrier. An angle measured between the exterior surface of the second section of the hood and the simple barrier may be approximately 110 degrees.

The first section of the hood may include an upper flange on the upper end thereof. The upper flange may be oriented substantially horizontally so that it can be positioned on the upper edge of the top rail and/or on top of the supports and attached thereto via any of various suitable fasteners, such as screws, bolts, or nails, or via welding or adhesives, among others. Alternately, the upper flange may be oriented substantially vertically so that it can be positioned on the front surface of the top rail and/or supports and attached thereto via any of various suitable fasteners as described above. Similarly, the lower end of the second section of the hood may include a lower flange that is positioned in a substantially vertical orientation so as to rest flat or flush against the front surface of the simple barrier, wherein the lower flange can be secured to the front surface of the simple barrier and/or an intermediate rail via any of suitable fasteners as described for the upper flange. In this way, the hood can be securely attached to the simple barrier via the upper flange and lower flange.

In some embodiments, the present invention may further include a hood corner assembly configured to be positioned at a corner formed by the simple barrier. The hood corner assembly is configured to cover the open side ends of the hoods that would otherwise exist at a corner formed by a simple barrier in order to prevent animals from climbing over the fence at the corner portion of the fence where a hood is otherwise not positioned.

The hood corner assembly may include an upper corner section, a lower corner section, and a pair of brackets. The upper corner section comprises a panel that is bent about a vertical axis so as to define a left side and a right side. The upper corner section can be bent so as to form an angle between the left and right sides of the upper corner section, wherein the angle is selected depending upon the angle of the corner formed by the simple barrier. Further, the upper corner section may be pre-formed to have the desired angle, or may be formed by joining multiple subparts to achieve the desired angle, and need not be formed specifically via bending. The upper corner section is configured to span the corner formed by the simple barrier and join a first section of a first hood on a first side of the corner with a first section of a second hood on a second side of the corner to form an APB having a hood with a substantially continuous surface along the length of the APB to prevent animals from climbing over the corner of the simple barrier.

Each of the brackets of the hood corner assembly comprises a first panel having a triangular configuration, a first flange extending from an upper end of the first panel, and a second flange extending from a lower end of the first panel. The first and second flanges are preferably each perpendicular to the first panel, and the first and second flanges extend in opposing directions. In use, each bracket is positioned on an end of a hood adjacent to the corner such that the second flange thereof is flush against a surface of a second section of the hood, such as the interior surface of the second section of the hood. When installed in this manner, the first flange of each bracket extends into the corner area of the simple barrier, such that the first flanges are positioned substantially horizontally.

The lower corner section comprises a panel that can be positioned in a horizontal orientation flush against the first flanges of each bracket so as to enclose an underside of the hood corner assembly. The panel is preferably shaped as a square or diamond. In this way, the hood corner assembly serves to provide a hood at a corner of a simple barrier, regardless of the angle of the corner, and encloses the ends of the hoods on the straight or linear segments of the simple barrier so that animals cannot pass over the simple barrier without encountering a hood.

The hood and the hood corner assembly may be made of any suitable material, such as for example, those listed as suitable for use in fabrication of the supports. The hood may be attached to the simple barrier by any means known or to be developed in the art. The upper end of the first section of the hood may be affixed to the top rail and/or supports of the simple barrier. In various embodiments of the invention, the hood, top rail, and fencing material may be formed integrally with one another, for example in a blow molding, thermoforming and/or stamping process. Alternatively, the hood and top rail may be formed integrally or the hood and fencing material may be formed integrally. The hood may be attached by a welding seam, epoxies, resins and other adhesives and/or screws, brackets and/or other fasteners.

Also included in the invention is an enclosure system to maintain an animal population on at least one side of a domain or other geographic space. The enclosure system may include at least one APB. In practice of the invention, for example, in a zoological garden or animal sanctuary, one may install the APB and related enclosures to maintain a first species (e.g., rattlesnakes) on one side of the barrier/enclosure and a second species (e.g., anoles) on the other side of the barrier. In some embodiments, it may be desirable that the APB includes two hoods, a first hood on a front surface of the barrier, and a second hood on the back or rear surface of the barrier in order to prevent animals on either side of the barrier from traversing the same.

Alternatively, the invention encompasses an enclosure system that includes at least three supports that are laterally spaced apart to define a series of substantially vertical planes that span the interval between each support. The supports may be any of those described above and arranged as described above. The perimeter of the area of domain that one wishes to enclose will dictate the location and the spacing of each support.

Any of the enclosure systems of the invention may include additional features, such as access portals, reinforcing structures, and additional security features (e.g., portions of electrified fencing). In an embodiment, the enclosure contains an access portal that permits pedestrian and/or vehicle traffic to pass in or out of the enclosure. The access portal may be in the form of a trap door-like structure inserted into the fencing, a conventional gate or door, a roller gate, a swing gate, and/or a drawbridge-like structure. In an embodiment, the gate or door is also fitted with a hood as described above.

Referring now to FIG. 1, there is shown an embodiment of the animal-proof barrier ("APB") 10 of the present invention. The APB 10 of the present invention includes two or more supports 12a (not visible), 12b inserted or secured to a substrate, such as the earth. The supports are laterally spaced from one another so as to define a vertical plane between any two serially spaced supports 12a, 12b. A fencing material 14 is attached to each of the individual supports 12a (not visible), 12b and spans the defined vertical plane(s). The fencing material 14 may have substantially the same height above the substrate as supports or may have a height that is less than that of the supports. The two supports 12a, 12b and the fencing material 14 so situated form a simple barrier 16 structure. The simple barrier 16 has a bottom edge 20 (that abuts the substrate or is buried within the substrate), a front surface 22, and a back surface 24. In embodiments wherein the height of the fencing material is less than the height of the supports, an intermediate rail 78 may be positioned along an upper end 15 of the fencing material 14 and between the supports 12. The APB 10 also includes a hood 34 positioned so as to extend between or across the top ends 13 of the supports 12a, 12b (or along the top rail 32), wherein the hood 34 is designed to prevent an animal from climbing over the fence. In embodiments wherein the fencing material has a height less than that of the supports, the hood spans the distance between the upper end of the fencing material and the top ends of the supports so that a barrier is formed along the entirety of the height of the supports.

Figure 2:
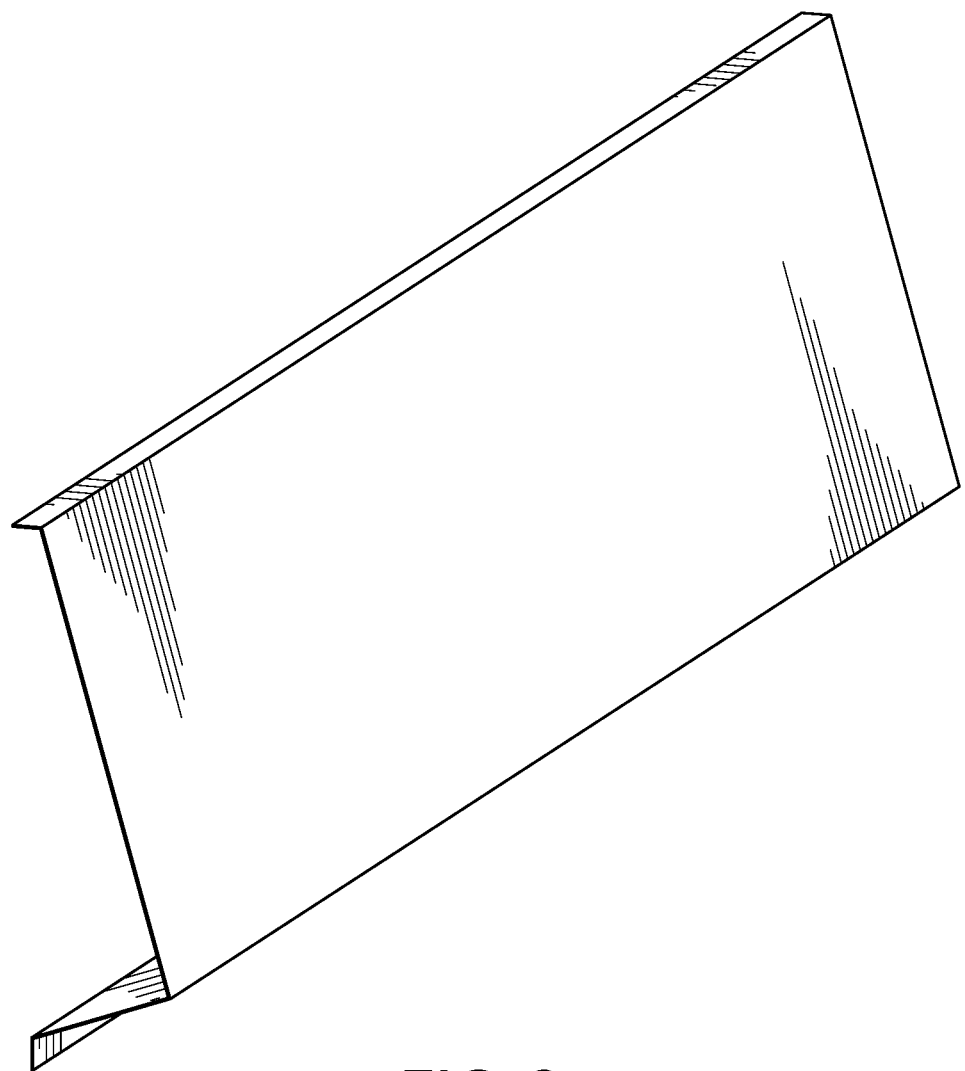
FIG. 2 is a perspective view of an embodiment of the hood of the present invention.
Figure 3:
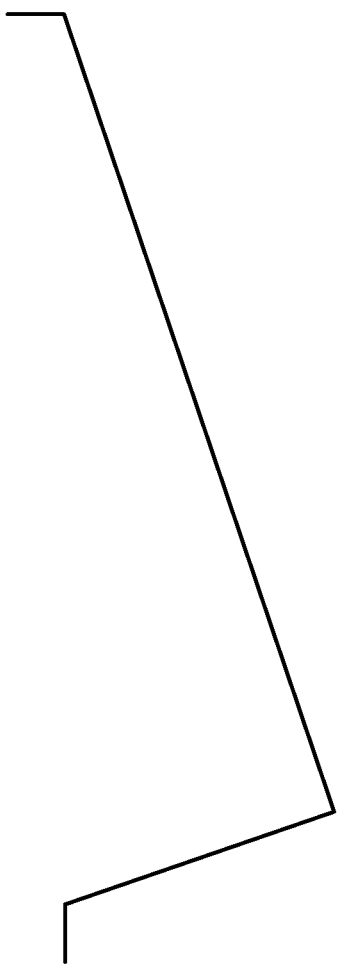
FIG. 3 is a side cross sectional view of the hood according to FIG. 2.

FIGS. 2 and 3 show an embodiment of the hood 34 of the APB 10 of the present invention. The hood 34 includes a first section 36 having an upper end 38 and a lower end 40, and a second section 42 having an upper end 44 and a lower end 46, wherein the upper end 44 of the second section 42 is connected to and along the lower end 10 of the first section 36. The first 36 and second 42 sections are preferably connected at an angle of about 90 degrees. In this way, the hood 34 has a substantially L-shaped configuration. However, in alternate embodiments, the first and second sections may be joined at different angles, such as angles from about 80 to about 100 degrees.

The upper end 38 of the first section 36 of the hood 34 is configured to be connected to a top rail 32 of the simple barrier 16, or to the top ends 13 of the supports 12a, 12b in embodiments lacking a top rail. When connected thereto, the first section 36 of the hood 34 extends downwardly from the top rail 32 (and/or top ends 13 of the supports 12a, 12b) and outwardly from the simple barrier. The angle formed between the first section of the hood and the simple barrier 16 is preferably about 10 to about 80 degrees. The second section 42 of the hood 34 extends downwardly from the lower end 40 of the first section 36 inwardly towards the simple barrier 16. Preferably, the lower end 46 of the second section 42 of the hood 34 contacts the front surface 22 of the simple barrier 16 when the hood 34 is installed on the simple barrier 16. In embodiments wherein the fencing material has a height less than that of the supports, the lower end 40 of the second section 42 contacts the upper end 15 of the fencing material 14 or the intermediate rail 78 at the upper end 15 of the fencing material 14 so as to span the distance between the upper end 15 of the fencing material 14 and the top end 13 of the supports 12. The exterior angle between the simple barrier 16 and the second section 42 is preferably about 110 degrees, as shown in FIG. 3.

In the illustrated embodiment of FIGS. 2-3, the width of the first section 36 of the hood 34 is approximately 22½ inches and the width of the second section 42 of the hood 34 is approximately 7 and 9/16 inch. These dimensions are not limiting and are purely for illustration of a hood formed in accordance with the present invention. The dimensions of the hood may vary depending upon the design criteria for the fence, such as the angle of the first section of the hood relative to the simple barrier, the size of the fence and hood, and on the size and type of animal(s) desired to be contained by the APB, among other relevant considerations. The width of the second section, as measured between the upper end and lower end thereof, is preferably sufficiently great such that an animal that scales the simple barrier and encounters the hood is incapable of simply reaching beyond the second section of the hood directly to the first section of the hood and proceeding to climb along the first section of the hood. As a result, the second section prevents the animal from transitioning from the simple barrier to the first section of the hood. The animal is unable to climb beyond the second section of the hood as the second section forms a steep overhang that is not readily avoided and that cannot itself be scaled or overcome due to the hood being composed of a material, such as a metal, that is low-friction and/or which has a low-friction coating and is not readily grasped by an animal's paws, claws, or the like.

In the illustrated embodiment, the upper end 38 of the first section further includes an upper flange 74 thereon for connecting the hood 34 to the simple barrier 16, wherein the upper flange 74 is substantially horizontal in configuration when the hood 34 is installed. In this way, the upper flange 74 is configured to rest on the top ends 13 of the supports 12 or on the top rail 32. The upper flange of the hood can be connected thereto via any of various suitable fasteners, such as screws, bolts, or nails, or via welding or adhesives, among others.

Further, the lower end 46 of the second section 42 of the hood 34 may include a lower flange 75 that is positioned in a substantially vertical orientation. The lower flange 75 is configured to rest flush against a front surface 22 of the simple barrier 16 or an intermediate rail 78 when the fence hood 34 is installed. Again, the lower flange 75 of the fence hood 34 can be secured to the simple barrier 16 or intermediate rail 78 via any of various suitable fasteners, such as screws, bolts, or nails, or via welding or adhesives, among others.

Figure 4:
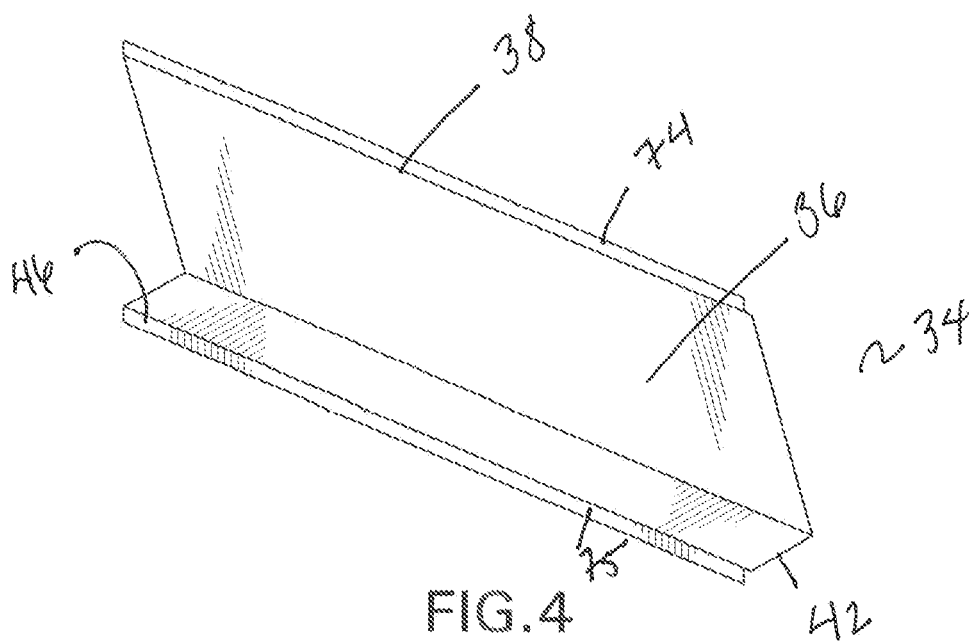
FIG. 4 is a perspective view of an alternate embodiment of the hood of the present invention.
Figure 5:
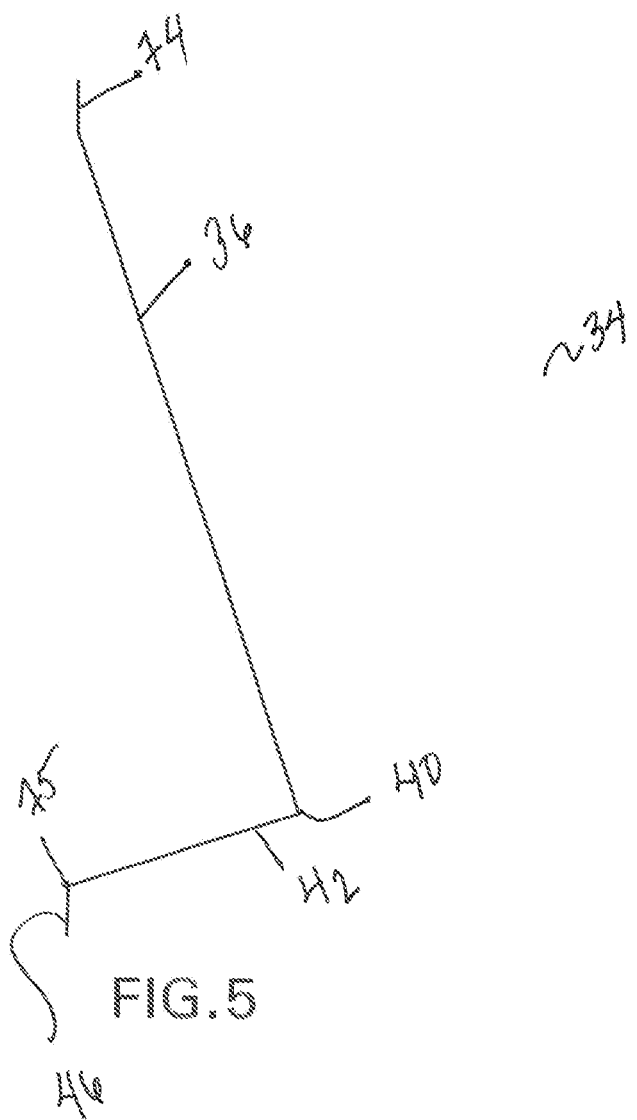
FIG. 5 is a side cross sectional view of the embodiment of the hood according to FIG. 4.

FIGS. 4-5 show an alternate embodiment of the hood of the present invention. The illustrated embodiments differs from that of FIGS. 2-3 only in that the upper flange 74 is positioned vertically rather than horizontally. In the illustrated embodiment, the upper 74 and lower flange 75 of the hood 34 lie in the same vertical plane. The upper flange 74 is configured to be secured to a front surface (not visible) of the supports 12 or to the top rail 78 at an upper end of the simple barrier, preferably at an uppermost portion of the front surface (not visible) of the simple barrier.

Figure 6:
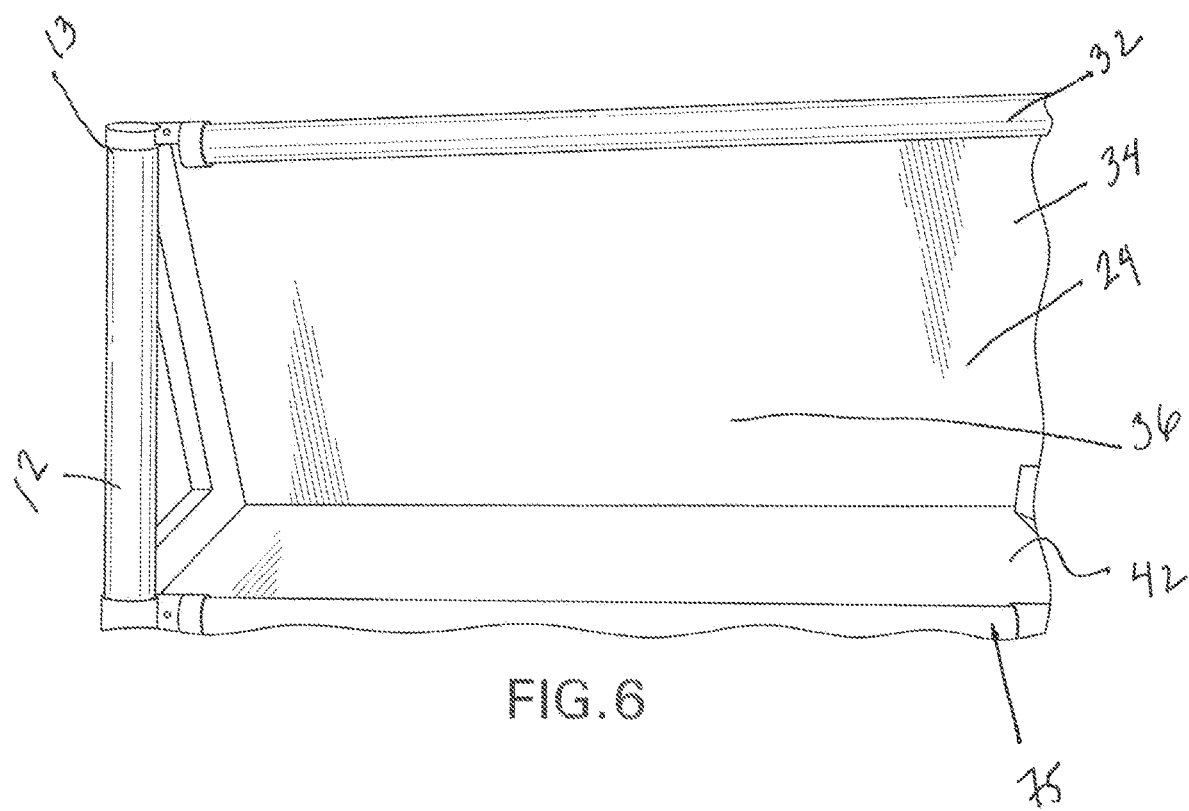
FIG. 6 is a perspective view of the rear of the hood of the animal proof barrier of the present invention.
Figure 7:
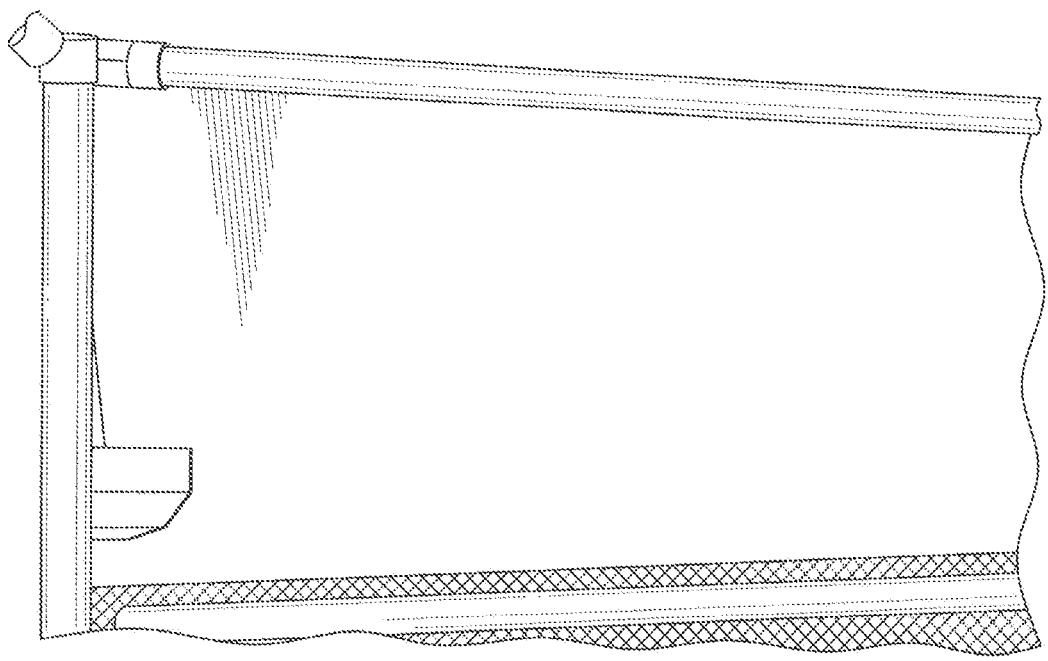
FIG. 7 is another perspective view of the rear of the hood of the animal proof barrier of the present invention.

Referring now to FIGS. 6-7, there are shown rear views of a hood of the animal proof barrier 10. In some embodiments, the fencing material 14 has a height less than that of the supports 12. In such embodiments, the hood 34 extends between the upper end 15 of the fencing material 14/intermediate rail 78 and the top rail 32 (or the top ends 13 of the supports 12) so as to provide a barrier along the entire height of the supports. This helps to minimize the amount of fencing material used, which saves time installing the fencing material and reduces the cost of the fencing material required to construct the animal proof barrier.

Figure 8:
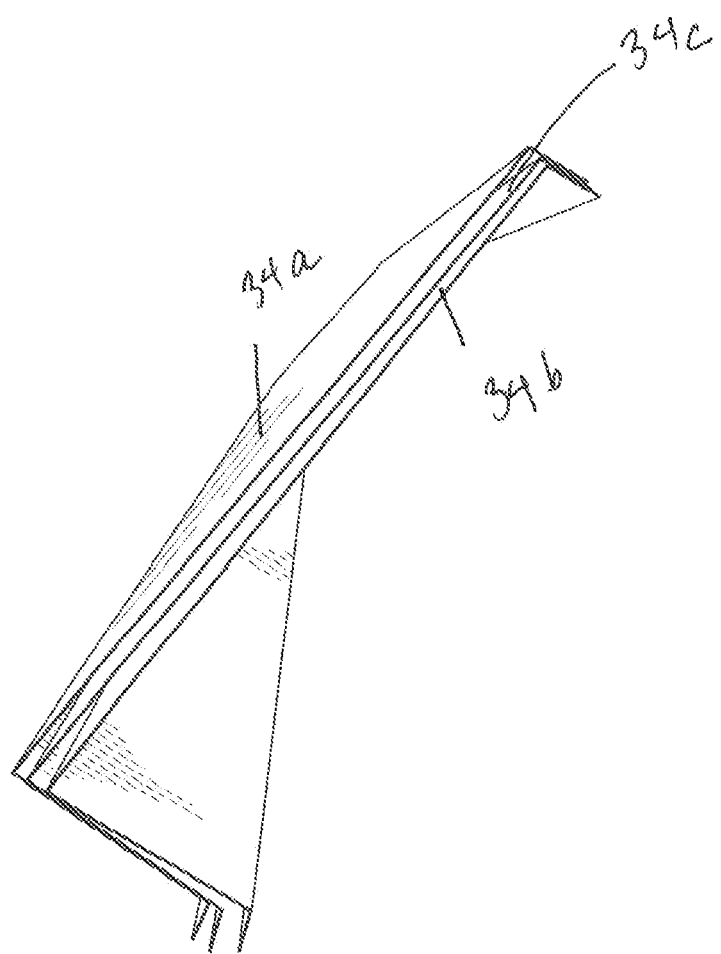
FIG. 8 is a perspective view of multiple hoods of the present invention in a stacked configuration for storage or transportation.

Referring now to FIG. 8, there is shown a perspective view of several hoods 34a, 34b, 34c of the present invention stored in a stacked configuration. Each hood preferably has an identical configuration and dimensions. The configuration of the hoods allows for multiple hoods constructed in accordance with the present invention to be stacked directly on top of one another, such that an interior surface of a first hood rests against the exterior surface of a second hood. In this way, multiple hoods can be conveniently stacked in a compact configuration to facilitate storage and transportation of the hoods.

Referring now to FIGS. 9-16, there are shown views of a hood corner assembly 48 of the present invention. In some instances, it is desirable to construct an APB 10 that is not linear and that includes different segments of a simple barrier connected at an angle other than 180 degrees, segments of a simple barrier connected at angles other than 180 degrees will be referred to herein simply as "corners." The APB 10 may be required to have one or more corners if it is desired for the APB to enclose a parcel of land, such as a square shaped parcel wherein the APB includes four corners each measuring 90 degrees. However, when constructing an APB with a first segment and a second segment connected at a 90 degree angle, the hoods as described herein that are positioned on each segment of the simple barrier would not connect or overlap at the corner, leaving a gap or discontinuity at the corner. As a result, the corner of the APB could be used as an access point for an animal to climb over or scale the APB without having to overcome a hood as described herein.

In one embodiment, the hood corner assembly comprises an upper corner section 58, a lower corner section 60, and a pair of brackets 62. The hood corner assembly 48 is configured to be positioned at the corner 50 of an APB 10 and connects the hoods 34a and 34b on each side of the corner. In this way, the hood corner assembly 48 allows for the construction of APBs with continuous hoods along the entire length of the APB, including at corners 50.

Figure 11:
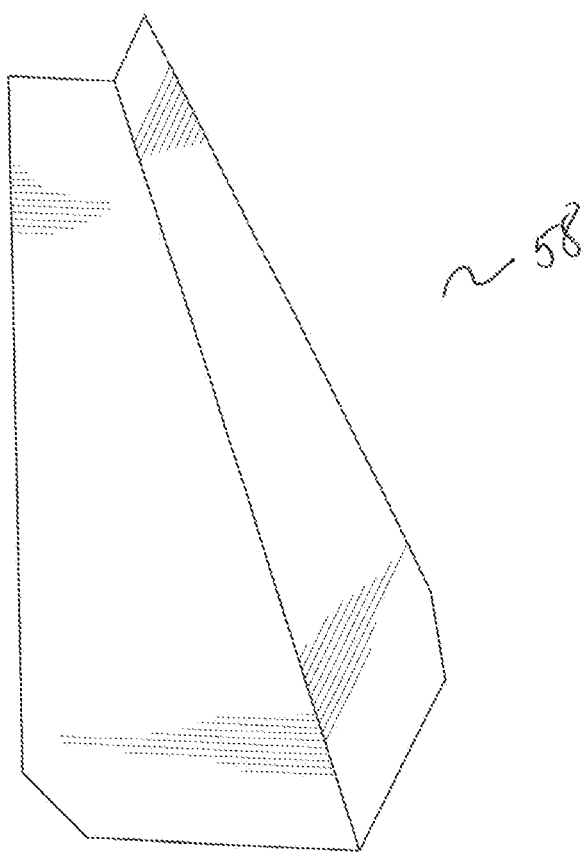
FIG. 11 is a perspective view of the exterior of an upper corner section of the hood corner assembly of the present invention.
Figure 12:
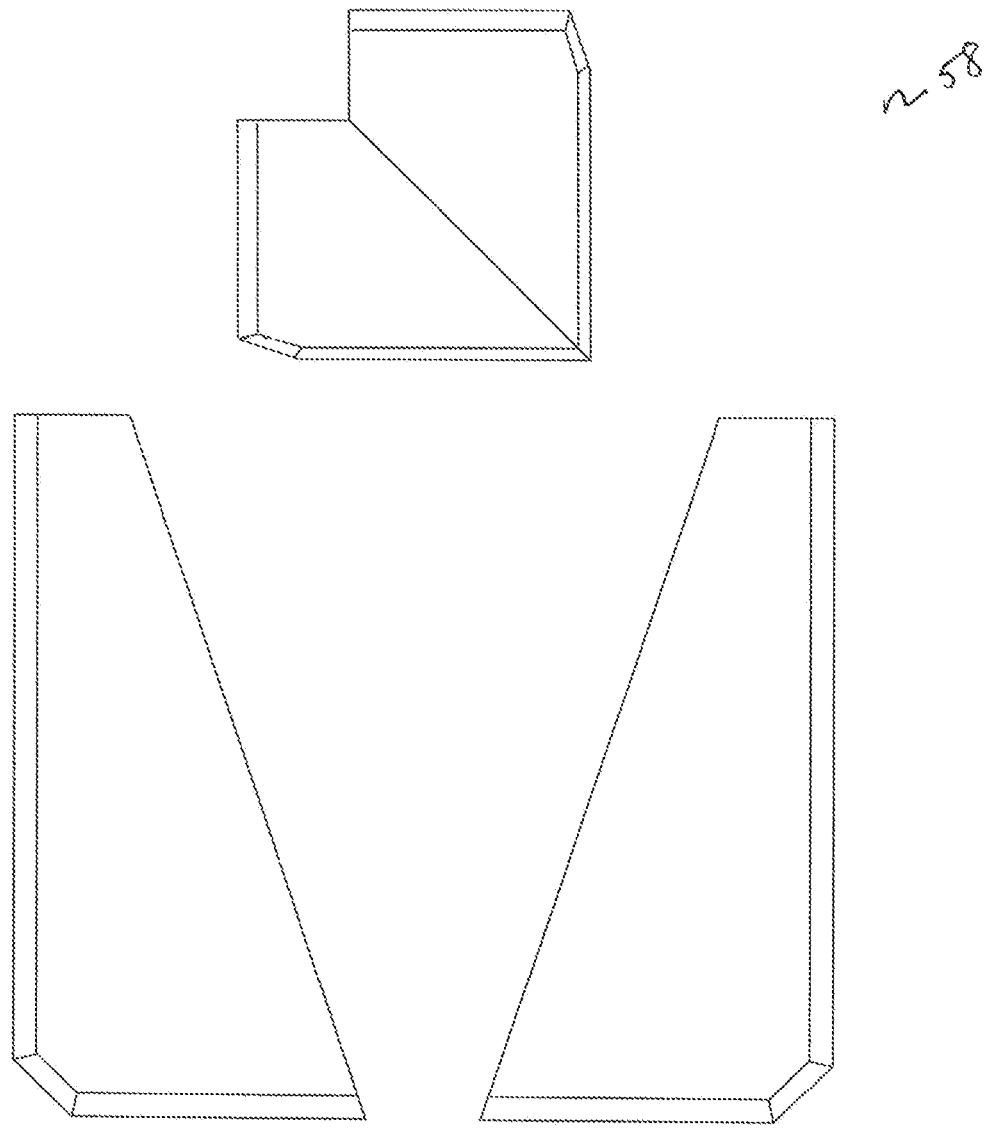
FIG. 12 are orthographic views of the upper corner section of the hood corner assembly of FIG. 11.

Referring now to FIGS. 11-12, there are shown views of an upper corner section 58 of the hood corner assembly 48 of the present invention. The upper corner section 58 comprises a panel 80 having any of various shapes, such as a square, rectangular, triangular, or trapezoidal shape, wherein the panel 80 is bent along a vertical axis so as to form a left side 86 and a right side 84 defining an angle therebetween. The panel 80 need not specifically be bent to form the upper corner section, and can be pre-formed with the desired angle, or may be constructed from various subparts connected at the desired angle. The upper corner section 58 has an angle such that the right side of the upper corner section can be positioned flush against a surface of the first section 36 of a first hood 34*a* on a first side 52 of a corner formed by the simple barrier 10, while the left side thereof can be positioned flush against a surface of the first section 36 of a second hood 34*b* on the opposing side of the corner, a shown for example at FIG. 16. In this way, the upper corner section forms a continuous surface with the first sections of the first hood and the second hood adjacent to the corner. The upper corner section is preferably positioned on the exterior surface of the first and second hoods on opposing sides of the corner; however, in alternate embodiments, the upper corner section may be positioned on an interior surface thereof or may be configured so as to be positioned end-to-end with the first and second hoods, such that there is no overlap.

In some embodiments, the upper corner section 58 further includes a flange 82 on an upper end 88 thereof. The flange 82 is preferably positioned substantially horizontally so that the flange 82 of the upper corner section 58 may be secured to the top rail 32 of the simple barrier 16 and/or to the upper flanges 74 of the first 34*a* and second hoods 34*b*, depending upon the embodiment. Any of various fasteners may be used, including but not limited to screws, bolts, or nails, or via welding or adhesives, among other conventional fastening methods.

Figure 13:
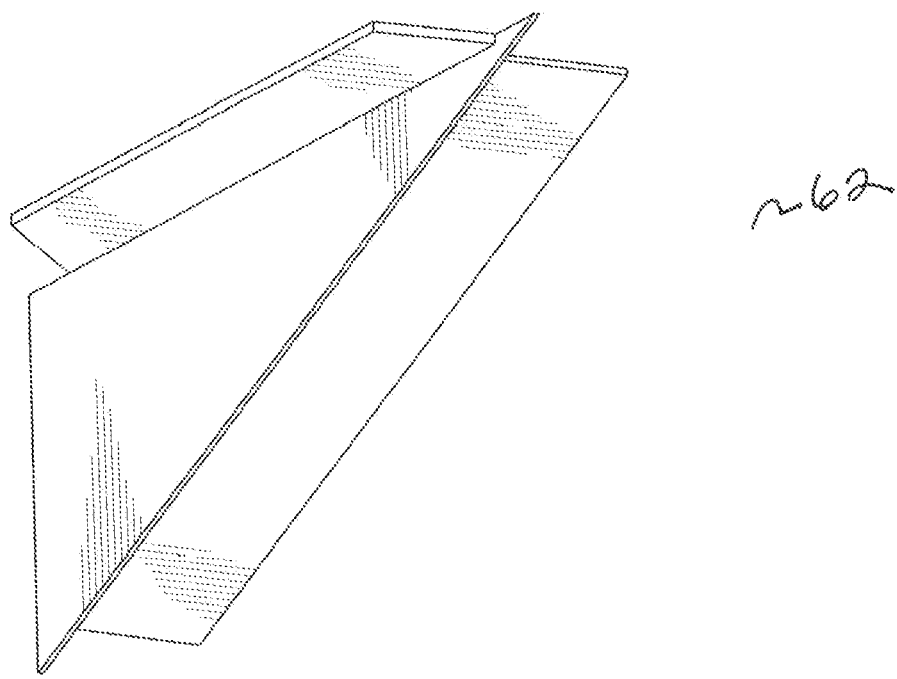
FIG. 13 is a perspective view of a bracket of the hood corner assembly of the present invention.
Figure 14:
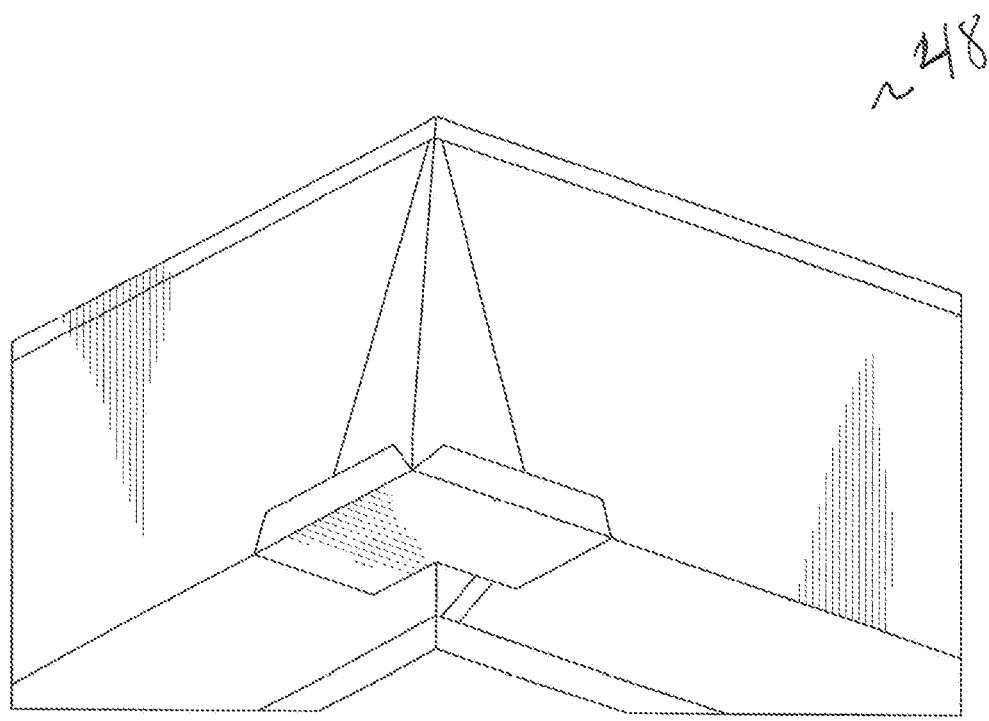
FIG. 14 is a rear perspective view of the hood corner assembly of the present invention.

Referring now to FIG. 13, there is shown a perspective view of the bracket 62 of the hood corner assembly 48 of the present invention. The hood corner assembly 48 further comprises a pair of brackets 62*a*, 62*b*. Each bracket comprises a first panel 64 having a triangular configuration. The first panel 64 is oriented such that a leg of the triangle is substantially horizontal, which serves as the upper end 68 of the first panel 64, and an adjacent leg (or the hypotenuse) of the triangle serves as the lower end 72 of the first panel 64. The first panel 64 further comprises a first flange 66 extending perpendicularly from the upper end thereof substantially along the length of the upper end 68 of the first panel 64. The first panel 64 further comprises a second flange 70 extending perpendicularly from the lower end thereof substantially along the length of the lower end, wherein the second flange 70 extends in an opposite direction as the first flange 66. For example, in one embodiment bracket 62 may be configured such that the first panel 64 has the shape of a right triangle, wherein the first flange 66 extends to a left side 86 of the first panel 64 and the second flange 70 extends to the right side 88 of the first panel 64.

In use, the second flange 70 of each bracket 62 is positioned against a surface of the second section 42 of a hood 34, such as an interior surface thereof, and secured thereto via any suitable fastener, such as a screw, bolt, nail or via welding or adhesives, among other fastening methods. When secured in this manner, the first panel 64 of the bracket 62 is positioned vertically and seals or encloses a portion of the end of the hood 34, and the first flange 66 is positioned substantially horizontally and extends toward the corner 50 formed by the simple barrier 16. In alternate embodiments, the first flange 66 need not be positioned substantially horizontally and may be positioned at a slight incline or decline relative to a horizontal plane.

Figure 9:
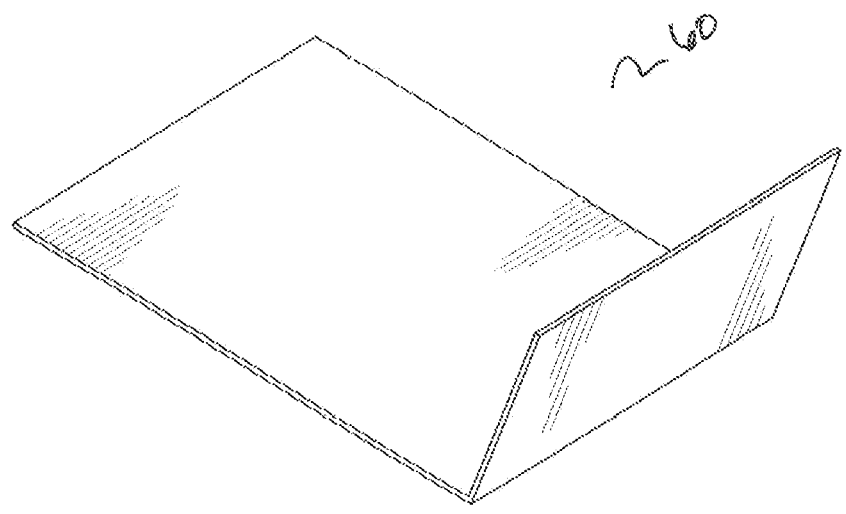
FIG. 9 is a perspective view of an embodiment of the lower corner section of the hood corner assembly of the present invention.
Figure 10:
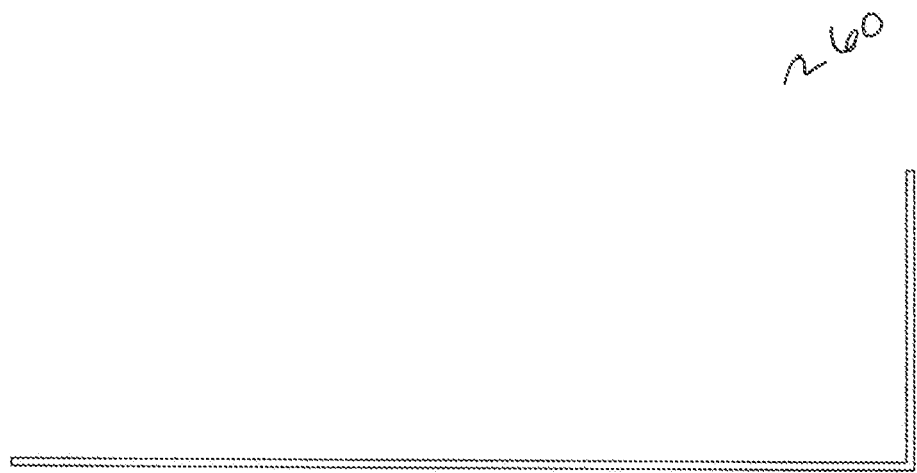
FIG. 10 is a cross sectional view of the lower corner section of the hood corner assembly of the present invention.
Figure 15:
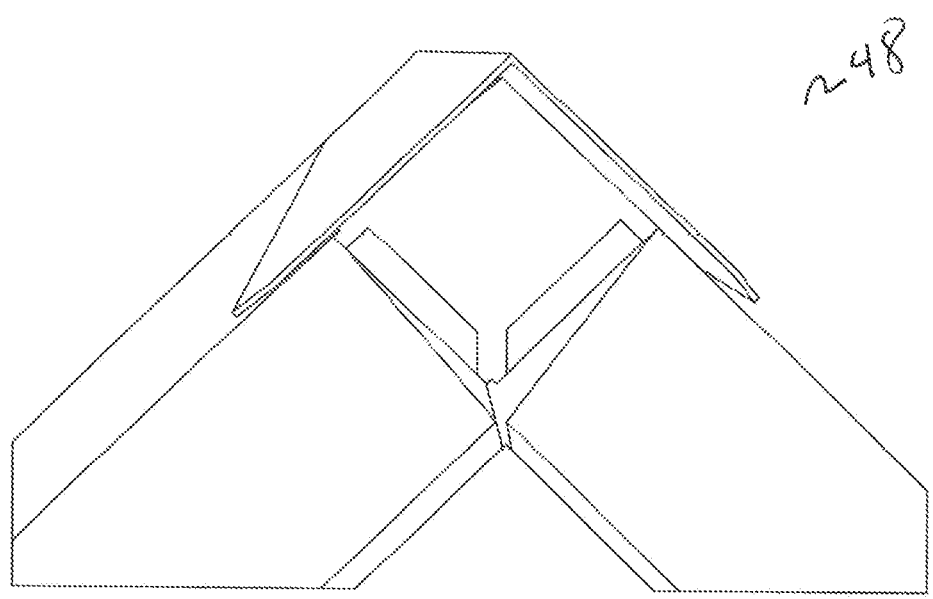
FIG. 15 is an underside view of the hood corner assembly of the present invention.
Figure 16:
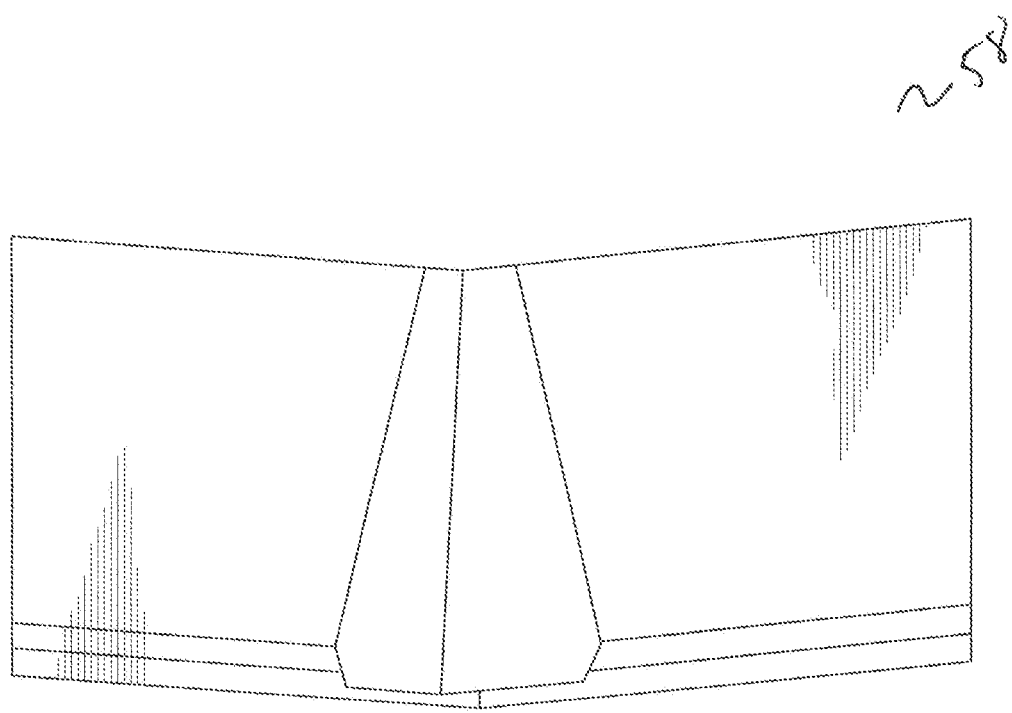
FIG. 16 is an exterior view of the upper corner section of the hood corner assembly.

To complete the hood corner assembly 48, the hood corner assembly further comprises a lower corner section 60 as shown for example at FIGS. 9-10. The lower corner section 60 includes a panel 80 that preferably has a square or diamond-shaped configuration, wherein the precise configuration is selected to suit the specific angle of the corner formed by the simple barrier. Thus, where the simple barrier has a corner of ninety degrees, the lower corner section is configured as a square in order to cover the area between the first and second hoods on opposing sides of the corner. In use, the lower corner section is configured to be positioned flush against the first flanges 66 of the pair of brackets 62, as best shown at FIG. 15. In the illustrated embodiment, the lower corner section 60 is positioned substantially horizontally. Preferably, the lower corner section 60 is sized so that the edges of the lower corner section contact the upper corner section 58 and the hoods adjacent to the corner. In this way, the lower corner section seals the underside of the hood corner assembly so as to prevent animals from crawling into or around the hoods or the hood corner assembly. The lower corner section may further include one or more flanges on the edges thereof that are adjacent to the upper corner section and hoods, as shown for example at FIG. 14, so that the lower corner section may be further secured to the hood corner assembly and/or the hoods.

The present invention allows for the construction of an APB having any desired configuration or layout, such as an APB having multiple straight segments connected at any of various angles so as to form corners. A hood can be positioned along each straight segment and a hood corner assembly can be positioned at the corners so that the APB includes a continuous hood along the length thereof such that animals cannot climb over or scale the APB and cannot enter the interior area between the hood or hood corner assembly and the simple barrier.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A substantially animal-proof barrier comprising:
   two supports that are laterally spaced apart to define a substantially vertical plane therebetween;
   fencing material that is attached to each of the supports and spans the defined substantially vertical plane to form a simple barrier that has a top edge, a bottom edge, a front surface and a back surface, wherein the simple barrier divides a domain into a first area and a second area, and wherein a top rail is attached to the back surface of the simple barrier along the top edge;
   a hood having a first section with an upper end and a lower end, and a second section having an upper end and a lower end, wherein the upper end of the second section is connected to and extends from the lower end of the first section at an angle of about 90 degrees;
   wherein the upper end of the first section is connected to the top rail or the top edge of the simple barrier and forms an angle with the front surface of the simple barrier of about 10 degrees to about 80 degrees, and the second section extends in a direction towards the front surface of the simple barrier such that the lower end of the second section contacts the front surface of the simple barrier, and
   a hood corner assembly configured to be positioned at a corner formed by the simple barrier so as to connect a first hood on a first side of the corner and a second hood on a second side of the corner, wherein the hood corner assembly comprises an upper corner section, a lower corner section, and a pair of brackets, and
   each of the pair of brackets comprises a first panel having a triangular configuration, a first flange extending from an upper end of the first panel, and a second flange extending from a lower end of the first panel in an opposite direction as the first flange, and wherein the second flange is connected to a second section of the hood such that the first panel of the bracket is in a substantially vertical orientation.

2. The substantially animal-proof barrier according to claim 1, wherein the supports are independently made of a material chosen from wood, plastic, polymer, fiberglass, metal, and combinations thereof.

3. The substantially animal-proof barrier according to claim 1, wherein the fencing material is chosen from mesh, chain link, sheets, and panels.

4. The substantially animal-proof barrier according to claim 1, wherein the first section of the hood comprises an upper flange at the upper end thereof.

5. The substantially animal-proof barrier according to claim 4, wherein the upper flange is positioned substantially vertically when the hood is attached to the simple barrier.

6. The substantially animal-proof barrier according to claim 4, wherein the upper flange is positioned substantially horizontally when the hood is attached to the simple barrier.

7. The substantially animal-proof barrier according to claim 1, wherein the second section of the hood comprises a lower flange at the lower end thereof.

8. The substantially animal-proof barrier according to claim 7, wherein the lower flange is positioned substantially vertically when the hood is attached to the simple barrier.

9. The substantially animal-proof barrier according to claim 1, wherein the lower corner section comprises a panel attached to the first flange of each of the pair of brackets that is configured to enclose an underside of the hood corner assembly.

10. The substantially animal-proof barrier according to claim 1, wherein the fencing material has a height less than a height of the supports.

11. The substantially animal-proof barrier according to claim 10, further comprising an intermediate rail extending between the supports and along an upper end of the fencing material.

* * * * *